US008641180B2

(12) United States Patent
Komatsu

(10) Patent No.: US 8,641,180 B2
(45) Date of Patent: Feb. 4, 2014

(54) INK JET RECORDING METHOD AND RECORDED MATTER

(75) Inventor: Hidehiko Komatsu, Chino (JP)

(73) Assignee: Seiko Epson Corporation (JP)

( * ) Notice: Subject to any disclaimer, the term of this patent is extended or adjusted under 35 U.S.C. 154(b) by 313 days.

(21) Appl. No.: 13/070,516

(22) Filed: Mar. 24, 2011

(65) Prior Publication Data

US 2011/0234683 A1 Sep. 29, 2011

(30) Foreign Application Priority Data

Mar. 24, 2010 (JP) ................................ 2010-068331

(51) Int. Cl.
*C09D 11/00* (2006.01)

(52) U.S. Cl.
USPC .......................................................... 347/100

(58) Field of Classification Search
USPC .................................................... 347/20, 100
See application file for complete search history.

(56) References Cited

U.S. PATENT DOCUMENTS

| | | | | |
|---|---|---|---|---|
| 5,609,671 | A | 3/1997 | Nagasawa | |
| 5,764,252 | A * | 6/1998 | Burr et al. | 347/20 |
| 5,928,419 | A | 7/1999 | Uemura | |
| 5,976,233 | A | 11/1999 | Osumi et al. | |
| 6,087,416 | A | 7/2000 | Pearlstine et al. | |
| 6,123,759 | A | 9/2000 | Mise et al. | |
| 6,136,286 | A | 10/2000 | Okuyama et al. | |
| 7,219,989 | B2 | 5/2007 | Uerz et al. | |
| 2002/0009547 | A1* | 1/2002 | Ito et al. | 427/337 |
| 2004/0032473 | A1* | 2/2004 | Ishimoto et al. | 347/100 |
| 2007/0076069 | A1* | 4/2007 | Edwards et al. | 347/100 |
| 2009/0295847 | A1 | 12/2009 | Mukai et al. | |
| 2011/0001779 | A1 | 1/2011 | Kida | |

FOREIGN PATENT DOCUMENTS

| | | |
|---|---|---|
| JP | 56-28256 | 3/1981 |
| JP | 56-28256 A | 3/1981 |
| JP | 3-56573 | 3/1991 |
| JP | 3-56573 A | 3/1991 |
| JP | 3-79678 A | 4/1991 |
| JP | 3-160068 | 7/1991 |
| JP | 3-160068 A | 7/1991 |
| JP | 4-18462 | 1/1992 |
| JP | 4-18462 A | 1/1992 |
| JP | 07-25878 | 10/1995 |

(Continued)

OTHER PUBLICATIONS

Patent English Abstract of Japanese Application 2004-195451 Published Jul. 15, 2004.

(Continued)

*Primary Examiner* — Laura Martin
(74) *Attorney, Agent, or Firm* — Harness, Dickey & Pierce, P.L.C.

(57) ABSTRACT

An ink jet recording method includes discharging droplets of an aqueous ink composition containing a coloring agent onto a non- or low-ink-absorbent recording medium as a first process and discharging droplets of a clear ink composition containing glycol ether at a content ratio in the range of 3 mass % to 10 mass %, inclusive, and a resin component but containing no coloring agent onto the recording medium as a second process. The first and second processes are performed in a single operation, and the droplets of the aqueous ink composition discharged in the single operation and those of the clear ink composition discharged in the same operation come into contact on the recording medium.

11 Claims, 1 Drawing Sheet

(56) References Cited

FOREIGN PATENT DOCUMENTS

| | | | |
|---|---|---|---|
| JP | 07-258578 | | 10/1995 |
| JP | 08-003498 | | 1/1996 |
| JP | 08-283596 | | 10/1996 |
| JP | 08-283596 | | 12/1996 |
| JP | 10-110110 | | 4/1998 |
| JP | 10-110111 | | 4/1998 |
| JP | 10-110114 | | 4/1998 |
| JP | 10-120958 | | 5/1998 |
| JP | 10-195331 | | 7/1998 |
| JP | 10-195360 | | 7/1998 |
| JP | 10-237349 | | 8/1998 |
| JP | 10-237349 | A | 9/1998 |
| JP | 10-330665 | | 12/1998 |
| JP | 10-330665 | A | 12/1998 |
| JP | 2000-044858 | | 2/2000 |
| JP | 2004-099766 | A | 4/2004 |
| JP | 2004-195451 | | 7/2004 |
| JP | 2005-081754 | A | 3/2005 |
| JP | 2005-088238 | A | 4/2005 |
| JP | 2005-305892 | A | 11/2005 |
| JP | 2009-137124 | A | 6/2009 |
| JP | 2010-000691 | A | 1/2010 |
| JP | 2010-006062 | A | 1/2010 |
| JP | 2010-046896 | A | 3/2010 |
| WO | WO-2009-110263 | A1 | 9/2009 |

OTHER PUBLICATIONS

Patent English Abstract of Japanese Application 2000-044858 Published Feb. 15, 2000.

Patent English Abstract of Japanese Application 07-258578 Published Oct. 9, 1995.

Patent English Abstract of Japanese Application 08-003498 Published Jan. 9, 1996.

Computer Generated Translation of Japanese Application 10-120958 Published May 12, 1998.

Patent English Abstract of Japanese Application 10-195331 Published Jul. 28, 1998.

Patent English Abstract of Japanese Application 19-195360 Published Jul. 28, 1998.

Computer generated translation of Japanese Application 10-330665A Published Dec. 15, 1998.

Computer Generated Translation of Japanese Application 08-283596 Published Dec. 29, 1996.

Patent English Abstract of Japanese Application 10-110110 Published Apr. 28, 1998.

Patent English Abstract of Japanese Application 10-110111 Published Apr. 28, 1998.

Patent English Abstract of Japanese Application 19-110114 Published Apr. 28, 1998.

Computer Generated Translation of Japanese Application 3-56573 Published Mar. 12, 1991.

Computer Generated Translation of Japanese Application 3-79678 Published Apr. 4, 1991.

Computer Generated Translation of Japanese Application 3-160068 Published Jul. 10, 1991.

Computer Generated Translation of Japanese Application 4-18462 Published Jan. 22, 1992.

Patent English Abstract of Japan 07-258578 Published Oct. 9, 1995.

Patent English Abstract of Japan 08-003498 Published Jan. 9, 1996.

Patent English Abstract of Japan 08-283596 Published Apr. 28, 1998 and Machine English Translation.

Patent English Abstract of Japan 10-110110 Published Oct. 29, 1996.

Patent English Abstract of Japan 10-110111 Published Oct. 29, 1996.

Patent English Abstract of Japan 10-110114 Published Oct. 29, 1996.

Patent English Abstract of Japan 10-120958 Published May 12, 1998 and Machine English Translation.

Patent English Abstract of Japan 10-195331 Published Jul. 28, 1998.

Patent English Abstract of Japan 10-195360 Published Dec. 15, 1998.

Patent English Abstract of Japan 10-330665 Published Jul. 28, 1998 and Machine English Translation.

Patent English Abstract of Japan 2000-044858 Published Feb. 15, 2000.

Patent English Abstract of Japan 2004-195451 Published Jul. 15, 2004.

Patent English Abstract of Japan 3-160068A Published Jul. 10, 1991.

Patent English Abstract of Japan 3-56573A Published Mar. 12, 1991.

Patent English Abstract of Japan 3-79678A Published Apr. 4, 1991.

Patent English Abstract of Japan 4-18462A Published Jan. 22, 1992.

Patent English Abstract of Japan 56-28256A Published Mar. 19, 1981.

Patent Abstract of JP10-237349A.

* cited by examiner

INK JET RECORDING METHOD AND RECORDED MATTER

BACKGROUND

1. Technical Field

The present invention relates to an ink jet recording method and recorded matter produced using this method.

2. Related Art

Known methods for recording images on non-ink-absorbent media such as plastics use nonaqueous ink compositions based on organic solvent because this type of ink composition is quick to dry and unlikely to bleed. However, some recent methods use aqueous ink compositions for reasons including human safety and environmental protection.

Incidentally, some methods using such an aqueous ink composition to record images on recording media include a process of coating the images formed using the aqueous ink composition with a clear ink composition, which contains no coloring material, to improve the friction fastness of the images (see JP-A-2004-195451 and JP-A-2000-44858).

However, images formed using only an aqueous ink composition sometimes have streaks and/or other defects due to aqueous ink repelled on the recording media. On the other hand, images formed using an aqueous ink composition and then coated with a clear ink composition in the way described above are sometimes of unfavorable quality because of their reduced color reproduction capability. Worse yet, some clear ink compositions make the images slow to dry.

SUMMARY

An advantage of some aspects of the invention is that they provide ink jet recording methods that solve these problems. Images formed in any of these methods have excellent friction fastness, fewer streaks than those formed in any known method, an excellent color reproduction capability, and excellent quickness to dry.

Some aspects of the invention can be embodied as the following aspects and exemplary applications.

Exemplary Application 1

An aspect of the ink jet recording method according to the invention includes discharging droplets of an aqueous ink composition containing a coloring agent onto a non- or low-ink-absorbent recording medium as a first process and discharging droplets of a clear ink composition containing glycol ether at a content ratio in the range of 3 mass % to 10 mass %, inclusive, and a resin component, but containing no coloring agent onto the recording medium as a second process. The first and second processes are performed in a single operation, and the droplets of the aqueous ink composition discharged in this single operation and those of the clear ink composition discharged in the same operation come into contact on the recording medium.

The ink jet recording method according to Exemplary Application 1 provides images that have excellent friction fastness, an excellent color reproduction capability, excellent quickness to dry, and few streaks.

Exemplary Application 2

In Exemplary Application 1, the glycol ether can be at least one selected from triethylene glycol monobutyl ether, diethylene glycol monohexyl ether, and dipropylene glycol monopropyl ether.

Exemplary Application 3

In Exemplary Application 1 or 2, the weight of the droplets of the clear ink composition can be in the range of 20% to 50%, inclusive, relative to that of the droplets of the aqueous ink composition.

Exemplary Application 4

In any one of Exemplary Applications 1 to 3, the content ratio of the resin component can be in the range of 5 mass % to 15 mass %, inclusive.

Exemplary Application 5

The ink jet recording methods according to Exemplary Applications 1 to 4 can further include drying the aqueous and clear ink compositions discharged onto the recording medium by heating the recording medium to a temperature equal to or higher than 40° C. as a third process.

The ink jet recording method according to Exemplary Application 5 makes the images formed on the recording medium further quick to dry.

Exemplary Application 6

The recorded matter according to the invention is recorded using the ink jet recording method according to any one of Exemplary Applications 1 to 5.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
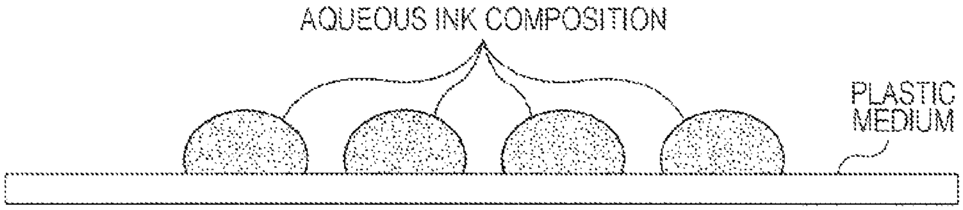
FIG. 1 is a schematic diagram that illustrates an aqueous ink composition discharged onto a recording medium.

The following describes a preferred embodiment of the invention. This embodiment is for the purpose of providing an exemplary aspect of the invention. The invention is not limited to this embodiment, and various modifications are allowed unless they make the invention deviate from its gist.

The ink jet recording method according to an embodiment of the invention includes discharging droplets of an aqueous ink composition containing a coloring agent onto a non- or low-ink absorbent recording medium as a first process and discharging droplets of a clear ink composition containing glycol ether at a content ratio in the range of 3 mass % to 10 mass %, inclusive, and a resin component but containing no coloring agent onto the recording medium as a second process. The first and second processes are performed in a single operation, and the droplets of the aqueous ink composition discharged in this single operation and those of the clear ink composition discharged in the same operation come into contact on the recording medium. In the invention, images represent printed patterns consisting of a group of dots, including printed text and solid prints.

First, the aqueous and clear ink compositions, which are individually used in the discharging processes mentioned above, are described.

1. Aqueous Ink Composition (1) Coloring Agent

The aqueous ink composition for the ink jet recording method according to this embodiment contains a coloring agent. Examples of the coloring agents that can be used in this embodiment include dyes and pigments; however, pigments are preferable because they hardly fade on exposure to light, gas, or other conditions. Thanks to this nature of pigments, images formed using a pigment on plastic or other similar recording media have excellent fastness to moisture, gas, light, and other conditions and favorable storage stability.

Examples of the pigments that can be used in this embodiment include, but are not limited to, inorganic pigments and organic pigments. Examples of appropriate inorganic pigments include titanium oxide and iron oxide as well as carbon blacks produced by any known method such as the contact method, the furnace method, the thermal method, or the like. On the other hand, examples of appropriate organic pigments include azo pigments (including azo lakes, insoluble azo pigments, condensed azo pigments, and chelate azo pigments), polycyclic pigments (e.g., phthalocyanine pigments, quinacridone pigments, diketopyrrolopyrrole pigments, benzimidazolone pigments, isoindolinone pigments, perylene pigments, perinone pigments, anthraquinone pigments, and quinophthalone pigments), nitro pigments, nitroso pigments, and aniline blacks.

Specific examples of the carbon blacks that can be used as a pigment in this embodiment include furnace blacks, lamp blacks, acetylene blacks, and channel blacks (C.I. Pigment Black 7). These carbon blacks are commercially available under trade names including the following: No. 2300, 900, MCF88, No. 20B, No. 33, No. 40, No. 45, No. 52, MA7, MA8, MA77, MA100, and No. 2200B (Mitsubishi Chemical Corporation); COLOUR BLACK FW series including FW 1, FW 2, FW 2V, FW 18, and FW 200, COLOUR BLACK S series including S 150, S 160, and S 170, PRINTEX series including 35, U, V, and 140 U, and SPECIAL BLACK series including 6, 5, 4A, 4, and 250 (Degussa GmbH); Conductex SC, and Raven series including 1255, 5750, 5250, 5000, 3500, 1255, and 700 (Columbian Chemicals Company); REGAL series including 400R, 330R, and 660R, MOGUL L, MONARCH series including 700, 800, 880, 900, 1000, 1100, 1300, and 1400, and ELFTEX 12 (Cabot Corporation).

As for the pigments that can be used to prepare the aqueous ink composition according to this embodiment as yellow ink, examples include C.I. Pigment Yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213.

As for the pigments that can be used to prepare the aqueous ink composition according to this embodiment as magenta ink, examples include C.I. Pigment Red 5, 7, 12, 48 (Ca), 48 (Mn), 57 (Ca), 57:1, 112, 122, 123, 168, 184, 202, and 209, and C.I. Pigment Violet 19.

As for the pigments that can be used to prepare the aqueous ink composition according to this embodiment as cyan ink, examples include C.I. Pigment Blue 1, 2, 3, 15:3, 15:4, 16, 22, and 60.

As for the pigments that can be used to prepare the aqueous ink composition according to this embodiment as green ink, examples include C.I. Pigment Green 7, 8, and 36.

As for the pigments that can be used to prepare the aqueous ink composition according to this embodiment as orange ink, examples include C.I. Pigment Orange 43, 51, and 66.

The content ratio of the coloring agent in the aqueous ink composition is preferably in the range of 1.5 mass % to 10 mass %, inclusive, and more preferably in the range of 2 mass % to 7 mass %, inclusive, relative to the total mass of the aqueous ink composition.

To use such a pigment in the aqueous ink composition, one should get the pigment capable of maintaining its stable dispersed state in water. Several methods can be used for this purpose, including the following: using a water-soluble resin and/or a water-dispersible resin, or any other resin-based dispersant to disperse the pigment (hereinafter, pigments dispersed using this method are referred to as resin-dispersed pigments); using a water-soluble surfactant and/or a water-dispersible surfactant to disperse the pigment (hereinafter, pigments dispersed using this method are referred to as surfactant-dispersed pigments); introducing hydrophilic functional groups to the surface of pigment particles so that the pigment can be dispersed and/or dissolved in water without the resin dispersant, the surfactant, or any other kind of dispersant (hereinafter, pigments dispersed using this method are referred to as surface-treated pigments). The aqueous ink composition used in the printing method according to this embodiment can contain any kind of the resin-dispersed, surfactant-dispersed, and surface-treated pigments described above and, if necessary, can contain two or more kinds in combination.

Examples of the resin dispersants that can be used to prepare the resin-dispersed pigments include polyvinyl alcohols, polyvinyl pyrrolidones, polyacrylic acid, acrylic acid-acrylonitrile copolymers, vinyl acetate-acrylate copolymers, acrylic acid-acrylate copolymers, styrene-acrylic acid copolymers, styrene-methacrylic acid copolymers, styrene-methacrylic acid-acrylate copolymers, styrene-α-methylstyrene-acrylic acid copolymers, styrene-α-methylstyrene-acrylic acid-acrylate copolymers, styrene-maleic acid copolymers, styrene-maleic anhydride copolymers, vinyl naphthalene-acrylic acid copolymers, vinyl naphthalene-maleic acid copolymers, vinyl acetate-maleate copolymers, vinyl acetate-crotonic acid copolymers, vinyl acetate-acrylic acid copolymers, and other similar polymers and copolymers, and salts of these polymers and copolymers. Among others, copolymers of a monomer having hydrophobic functional groups and another having hydrophilic functional groups, and polymers of a monomer having both hydrophobic and hydrophilic functional groups are particularly preferable. When any kind of copolymer is used, it can be used in the form of a random copolymer, a block copolymer, an alternating copolymer, or a graft copolymer.

Examples of the salts mentioned above include ones the basic compound of which is ammonia, ethylamine, diethylamine, triethylamine, propylamine, isopropylamine, dipropylamine, butylamine, isobutyl amine, diethanolamine, triethanolamine, triisopropanolamine, aminomethylpropanol, morpholine, or the like. The amount of the basic compound is not particularly limited; however, it should be equal to or greater than the neutralization equivalent.

The molecular weight of the resin dispersant is preferably in the range of 1,000 to 100,000 and more preferably in the range of 3,000 to 10,000 on a weight average molecular weight ($M_w$) basis. A resin dispersant having a molecular weight falling within either one or both of these ranges will make the coloring agent capable of maintaining its stable dispersed state in water as well as make it easy to control the viscosity of the aqueous ink composition and to condition the aqueous ink composition in other ways.

Commercially available products can also be used as the resin dispersant. Specific examples include JONCRYL series available from BASF Japan Ltd., including JONCRYL 67 ($M_w$: 12,500; acid value [AV]: 213), 678 ($M_w$: 8,500; AV: 215), 586 ($M_w$: 4,600; AV: 108), 611 ($M_w$: 8,100; AV: 53), 680 ($M_w$: 4,900; AV: 215), 682 ($M_w$: 1,700; AV: 238), 683 ($M_w$: 8,000; AV: 160), and 690 ($M_w$: 16,500; AV: 240).

As for the surfactant-dispersed pigments, examples of the surfactants that can be used to prepare them include the following: anionic ones such as alkane sulfonic acid salts, α-olefin sulfonic acid salts, alkylbenzene sulfonic acid salts, alkylnaphthalene sulfonic acid salts, acylmethyl tauric acid salts, dialkyl sulfosuccinic acid salts, alkyl sulfuric acid ester salts, sulfated olefins, polyoxyethylene alkyl ether sulfonic acid ester salts, alkyl phosphoric acid ester salts, polyoxyethylene alkyl ether phosphoric acid ester salts, and monoglyceride phosphoric acid ester salts; amphoteric ones such as alkyl pyridium salts, alkyl amino acid salts, and alkyl dimethyl betaines; nonionic ones such as polyoxyethylene alkyl ethers, polyoxyethylene alkyl phenyl ethers, polyoxyethylene alkyl esters, polyoxyethylene alkyl amides, glycerol alkyl esters, and sorbitan alkyl esters.

The content ratio of the resin dispersant or surfactant in the pigment is preferably in the range of 1 part by mass to 100 parts by mass and more preferably in the range of 5 parts by mass to 50 parts by mass relative to 100 parts by mass of the pigment. A resin dispersant or surfactant having a content ratio falling within either one or both of these ranges will ensure that the pigment can maintain its stable dispersed state in water.

As for the surface-treated pigments, examples of appropriate hydrophilic groups include —OM, —COOM, —CO—, —$SO_3M$, —$SO_2NH_2$, —$RSO_2M$, —$PO_3HM$, —$PO_3M_2$, —SO2NHCOR, —$NH_3$, and —$NR_3$ (M: hydrogen, an alkali metal, Ammonium, or an organic ammonium; R: an alkyl group having one to twelve carbon atoms, or a substituted or unsubstituted phenyl group, or a substituted or unsubstituted naphthyl group). These functional groups are physically and/or chemically grafted onto the surface of pigment particles, directly and/or via any kind of multivalent group. Examples of appropriate multivalent groups include alkylene groups having one to twelve carbon atoms, and substituted or unsubstituted phenylene groups, and substituted or unsubstituted naphthylene groups.

When a surface-treated pigment is used, it is preferable that the pigment have been surface-treated with a sulfur-containing agent in order that pigment particles can have —$SO_3M$ and/or —$RSO_2M$ chemically bound onto their surface (M: the counter ion, more specifically, proton, an alkali metal ion, an ammonium ion, or an organic ammonium ion). More specifically, it is preferable that the surface-treated pigment have been treated in the following way: The raw material pigment is dispersed in a solvent that contains no active protons and is nonreactive with sulfonic acids and in which the pigment is insoluble or only slightly soluble, and then pigment particles are surface-treated with amidosulfonic acid or any kind of complex of sulfur trioxide and a tertiary amine to have —$SO_3M$ and/or —$RSO_2M$ chemically bound onto their surface so that the pigment can be dispersed and/or dissolved in water.

The surface treatment for grafting a functional group or its salt onto the surface of the pigment particles, directly or via any kind of multivalent group, can be performed by various known methods. Examples of appropriate known methods include the following: further oxidizing a commercially available oxidized carbon black with ozone or sodium hypochlorite solution to make the surface of carbon black particles further hydrophilic (e.g., the methods disclosed in JP-A-7-258578, JP-A-8-3498, JP-A-10-120958, JP-A-10-195331, and JP-A-10-237349); treating a carbon black with 3-amino-N-alkyl pyridium bromide (e.g., the methods disclosed in JP-A-10-195360 and JP-A-10-330665); dispersing an organic pigment in a solvent in which the pigment is insoluble or only slightly soluble, and subsequently introducing sulfo groups onto the surface of pigment particles with a sulfonating agent (e.g., the methods disclosed in JP-A-8-283596, JP-A-10-110110, and JP-A-10-110111); dispersing an organic pigment in a basic solvent that can form a complex with sulfur trioxide, and subsequently surface-treating pigment particles by addition of sulfur trioxide so that sulfo or sulfoamino groups should be introduced (e.g., the method disclosed in JP-A-10-110114). However, the method for preparing a surface-treated pigment used in the invention is riot limited to these.

A single kind or two or more kinds of functional groups can be grafted onto each pigment particle. The kind(s) of the functional group(s) grafted and the degree of grafting can be suitably selected depending the desired dispersion stability of the pigment in ink, the desired color density of the ink to be obtained, how quick to dry the ink to be obtained should be at the front of an ink jet head, and other factors.

For all these resin-dispersed, surfactant-dispersed, and surface-treated pigments, dispersing the raw material pigment in water can be performed in commonly used dispersing machines, including ball mills, sand mills, attritors, roller mills, agitator mills, Henschel mixers, colloid mills, ultrasonic homogenizers, jet mills, and angstrom mills. A resin-dispersed pigment can be prepared by processing a raw material pigment, water, and a resin dispersant in any of these dispersing machines. A surfactant-dispersed pigment can be prepared by processing a raw material pigment, water, and a surfactant in any of the dispersing machines. A surface-treated pigment can be prepared by surface-treating the particles of a raw material pigment and then processing the resultant pigment and water in any of the dispersing machines. In all these schemes, a water-soluble organic solvent, a neutralizing agent, and other ingredients can be added to the ingredients if necessary. The particle diameter of the resultant pigment is preferably in the range of 20 nm to 500 nm and more preferably in the range of 50 nm to 200 nm on an average particle diameter basis because this will ensure that the pigment can maintain its stable dispersed state in water.

(2) Resin Component

The aqueous ink composition for the ink jet recording method according to this embodiment can contain a water-soluble resin component and/or a non-water-soluble resin component. The resin component will help the ink get cured and the cured ink strongly adhere to plastic media. The resin component may have a dissolved form or a dispersed form in the aqueous ink composition when the resin component is used in a dissolved form, appropriate resins are the same as those used to prepare a resin-dispersed pigment as the coloring agent of the aqueous ink composition for the ink jet recording method according to this embodiment. When the resin component is used in a dispersed form, appropriate resins are ones insoluble or only slightly soluble in the solvent contained in the aqueous ink composition for the printing method according to this embodiment; the resin is processed into fine particles and then dispersed (to have the form of an emulsion or a suspension) in the aqueous ink composition.

Examples of the resins appropriate for use as the resin component include the following: polyacrylate and its copolymers; polymethacrylate and its copolymers; polyacrylonitrile and its copolymers; polycyanoacrylate, polyacrylamide, polyacrylic acid, polymethacrylic acid, polyethylene, polypropylene, polybutene, polyisobutylene, polystyrene, and their copolymers; petroleum resins, coumarone-indene resins, and terpene resins; polyvinyl acetate and its copolymers; polyvinyl alcohol, polyvinyl acetal, and polyvinyl ether; polyvinyl chloride and its copolymers; polyvinylidene chloride; fluorocarbon resins and fluorocarbon rubbers; polyvinyl carbazole; polyvinyl pyrrolidone and its copolymers; polyvinyl pyridine and polyvinyl imidazole; polybutadiene and its copolymers; polychloroprene and polyisoprene; natural resins. Among others, ones having both hydrophobic and hydrophilic moieties in their molecular structure are particularly preferable.

Fine particles of the resin component can be obtained by any of the following methods, and, if necessary, two or more of these methods can be combined: mixing the monomers as the constituents of the desired resin component with a polymerization catalyst (a polymerization initiator) and a dispersant and then polymerizing the monomers (i.e., emulsion polymerization); dissolving a resin component having a hydrophilic moiety in a water-soluble organic solvent, mixing the obtained solution with water, and then removing the water-soluble organic solvent by distillation or any other appropriate technique; dissolving a resin component in a non-water-soluble organic solvent and then mixing the obtained solution and a dispersant with an aqueous solution. Any one or more of these methods can be suitably selected depending on the kind and characteristics of the resin component used. When any kind of dispersant is used to disperse the resin component, the kind of the dispersant is not particularly limited; however, examples of appropriate dispersants include anionic surfactants (e.g., sodium dodecyl benzene sulfonate, sodium lauryl phosphate, and polyoxyethylene alkyl ether ammonium sulfates) and nonionic surfactants (e.g., polyoxyethylene alkyl ethers, polyoxyethylene alkyl esters, polyoxyethylene sorbitan fatty acid esters, and polyoxyethylene alkyl phenyl ethers). These dispersants may be used singly or in combination of two or more kinds.

When the resin component is used in the form of fine particles (in the form of an emulsion or a suspension), fine particles of resin obtained from known materials or by using known methods can also be used. For example, the materials disclosed in JP-A-62-1426, JP-A-3-56573, JP-A-3-79678, JP-A-3-160068, JP-A-4-18462, and other related publications can be used. Furthermore, commercially available products can also be used, and specific examples of them include the products available under the following trade names: MICROGEL E-1002 and E-5002 (Nippon Paint Co., Ltd.); VONCOAT 4001 and 5454 (Dainippon Ink and Chemicals); SAE 1014 (Zeon Corporation); SAIVINOL SK-200 (Saiden Chemical Industry, Co., Ltd.); JONCRYL 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (BASF Japan Ltd.).

When the resin component is used in the form of fine particles, its average particle diameter is preferably in the range of 5 nm to 400 nm and more preferably in the range of 50 nm to 200 nm because this will ensure the storage stability and stable discharge of the aqueous ink composition.

The content ratio of the resin component is preferably in the range of 0.1 mass % to 15 mass %, inclusive, and more preferably in the range of 0.5 mass % to 10 mass %, inclusive, on a solid content basis, relative to the total mass of the aqueous ink composition. A resin component having a content ratio falling within either one or both of these ranges will make the aqueous ink composition for the ink jet recording method according to this embodiment capable of get cured and fixed even on plastic media.

(3) Surfactant

The aqueous ink composition for the ink jet recording method according to this embodiment can contain a surfactant. Examples of preferred surfactants include silicone surfactants and acetylene glycol surfactants.

A reason for the preference for silicone surfactants is that they will help the resultant ink spread evenly on a plastic medium and thereby prevent bleed and inconsistency in color density of the ink. When a silicone surfactant is used, its content ratio is preferably in the range of 0.1 mass % to 1.5 mass %, inclusive, relative to the total mass of the aqueous ink composition. A silicone surfactant having a content ratio falling within this range can fully provide its effect described above.

Examples of preferred kinds of silicone surfactants include polysiloxane compounds, such as polyether-modified organosiloxane. More specific examples include the products commercially available under the following trade names: BYK-306, BYK-307, BYK-333, BYK-341, BYK-345, BYK-346, and BYK-348 (BYK Japan KK); KF-351A, KF-352A, KF-353, KF-354L, KP-355A, KF-615A, KF-945, KF-640, KF-642, KF-643, KF-6020, X-22-4515, KF-6011, KF-6012, KF-6015, and KF-6017 (Shin-Etsu Chemical Co., Ltd.).

Acetylene glycol surfactants will help the ink maintain its surface tension and interfacial tension better than any other surfactants, and this type of surfactant hardly foams. The addition of an acetylene glycol surfactant is preferable in the following ways: The acetylene glycol surfactant will help the ink maintain its surface tension and the interfacial tension between the ink and a head nozzle face or any other printer component that comes into contact with the ink, and thereby improve the discharge stability of the ink when it is used in an ink jet recording method; An aqueous ink composition containing an acetylene glycol surfactant can wet and penetrate plastic media well and thereby makes it possible to produce high-definition images with little bleed and inconsistency in color density of ink occurring. When an acetylene glycol surfactant is used, its content ratio is preferably in the range of 0.1 mass % to 1.0 mass, inclusive, relative to the total mass of the aqueous ink composition. An acetylene glycol surfactant having a content ratio falling within this range can fully provide its effect described above.

Examples of appropriate acetylene glycol surfactants include the products commercially available under the following trade names: Surfynol 104, 104E; 104H, 104A, 104BC, 104DPM, 104PA, 104PG50, 104S, 420, 440, 465, 485, SE, SE-F, 504, 61, DF-37, DF-110D, CT-111, CT-121, CT-131, CT-136, TG, and GA (Air Products and Chemicals, Inc.); OLFINE B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (Nissin Chemical Co., Ltd.); Acetylenol 500, E00P, 540, and E100 (Kawaken Fine Chemicals Co., Ltd.).

(4) Water-Soluble Organic Solvent

The aqueous ink composition for the ink jet recording method according to this embodiment can contain a water-soluble organic solvent. Examples of preferred water-soluble organic solvents include 1,2-alkanediols, multivalent alcohols, and pyrrolidone derivatives.

A reason for the preference for 1,2-alkanediols is that they can drastically improve, synergistically with the surfactant mentioned above, the wettability of this ink composition to plastic media and thereby help the ink composition wet such a medium evenly. Furthermore, 1,2-alkanediols are highly compatible with glycol ethers. Thus, when the aqueous ink composition contains any kind of 1,2-alkanediol, which is highly compatible with glycol ethers, the aqueous ink composition and a clear ink composition containing glycol ether are highly consolute and quickly grit mixed upon contact on a plastic medium.

There is also another reason for the preference for 1,2-alkanediols: When this ink composition contains a pigment as a coloring agent, a 1,2-alkanediol is unlikely to make the dispersivity of pigment particles unstable.

When a 1,2-alkanediol is used, its content ratio is preferably in the range of 1 mass % to 8 mass %, inclusive, relative to the total mass of the aqueous ink composition. Examples of appropriate 1,2-alkanediols include 1,2-butanediol, 1,2-pentanediol, and 1,2-hexanediol, 1,2-pentanediol and 1,2-hexanediol are more preferable than others because they are highly soluble in water and can wet plastic media well.

A reason for the preference for multivalent alcohols is that they will make the ink slow to dry and to get cured on the nozzle face of an ink jet head and thereby prevent defects during printing such as clogging and incomplete discharge of the ink. Preferred kinds of multivalent alcohols are ones having a high vapor pressure. A reason for this is that it is desirable that the water-soluble organic solvent should evaporate away along with water while the aqueous ink composition is drying. When a multivalent alcohol is used, its content ratio is preferably in the range of 2 mass % to 20 mass %, inclusive, relative to the total mass of the aqueous ink composition. A multivalent alcohol having a content ratio falling within this range can fully provide its effect described above.

Examples of appropriate multivalent alcohols include ethylene glycol, diethylene glycol, propylene glycol, dipropylene glycol, 1,3-propanediol, 1,4-butanediol, and hexylene glycol. Among others, ethylene glycol, diethylene glycol, propylene glycol, dipropylene glycol, and hexylene glycol are particularly preferable because they have a high vapor pressure and do not interfere with images drying.

A reason for the preference for pyrrolidone derivatives is that they will act as a solvent or softener good for both the resin component mentioned above and the ink-fixing surface of plastic media. Furthermore, the addition of a pyrrolidone derivative will help the resin component form a coating on a plastic medium while the ink is drying and thereby make the ink quick to get cured and fixed on the plastic medium. When a pyrrolidone derivative is used its content ratio is preferably in the range of 1 mass % to 8 mass, inclusive, relative to the total mass of the aqueous ink composition. A pyrrolidone derivative having a content ratio falling within this range can fully provide its effect described above.

Examples of appropriate pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. Among others, 2-pyrrolidone because is particularly preferable because it will ensure the storage stability of the aqueous ink composition and effectively promote the film formation from the resin component.

(5) Water

The aqueous ink composition for the ink jet recording method according to this embodiment contains water. Water is the most common vehicle for ink compositions, and it evaporates and disperses in the air when its surroundings are dry. Preferably, the water contained in the aqueous ink composition is purified water such as ion-exchanged water, ultrafiltered water, reverse-osmosis-purified water, or distilled water, or ultrapure water, or any other kind of water containing as small amounts of ionic impurities as possible. Sterilized water obtained by irradiation with ultraviolet light, the addition of hydrogen peroxide, or any other appropriate technique is more preferable because water sterilized in such a way will prevent molds and bacteria from occurring in an ink composition and the pigment dispersion liquid contained in it during long-term storage.

(6) Polyolefin Wax

The aqueous ink composition for the ink jet recording method according to this embodiment can contain polyolefin wax. The addition of polyolefin wax is preferable because it will make it possible to form images with good physical smoothness and friction fastness even on plastic media. When polyolefin wax is used, its content ratio is preferably in the range of 0.01 mass % to 10 mass %, inclusive, and more preferably in the range of 0.05 mass % to 1 mass %, inclusive, relative to the total mass of the aqueous ink composition. A polyolefin wax having a content ratio falling within either one or both of these ranges can fully provide its effect described above.

Examples of appropriate polyolefin waxes include ones made from ethylene, propylene, butylene, or any other kind of olefin or from any of their derivatives or copolymers, more specifically, polyethylene waxes, polypropylene waxes, and polybutylene waxes. Commercially available products can also be used as the polyolefin wax, and specific examples of them include the products available under the following trade names: NOPCOAT PEM-17 (SAN NOPCO Ltd.); CHEMIPEARL W400 (Mitsui Chemicals, Inc.); AQUACER 515 and 593 (BYK Japan KK).

(7) Other Ingredients

The aqueous ink composition for the ink jet recording method according to this embodiment can further contain a pH adjusting agent, a preservative/antimold, an antirust, a chelator, and/or other additives. The addition of these materials is preferable because they can further improve the characteristics of the aqueous ink composition.

Examples of appropriate pH adjusting agents include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

As for the preservative/antimold, examples of appropriate ones include sodium benzoate, sodium pentachlorophenol, sodium 2-pyridinethiol-1-oxide, sodium sorbate, sodium dehydroacetate, and 1,2-dibenzothiazolin-3-one. Appropriate commercially available products include those sold under the following trade names: Proxel XL2 and GXL (Avecia); Denicide XR-5 and NS-500W (Nagase ChemteX Corporation).

As for the antirust, examples of appropriate ones include benzotriazole.

As for the chelator, examples of appropriate ones include ethylenediaminetetraacetic acid and its salts (e.g., disodium dihydrogen ethylenediaminetetraacetate).

(8) Physical Properties

The viscosity of the aqueous ink composition for the ink jet recording method according to this embodiment at 20° C. is preferably in the range of 2 mPa·s to 10 mPa·s, inclusive, and more preferably in the range of 3 mPa·s to 6 mPa·s, inclusive. An aqueous ink composition having a viscosity at 20° C. falling within either one or both of these ranges can be discharged from nozzles in an appropriate amount and thus will be further prevented from travelling in random directions and spattering; such an ink composition is suitable for use in an ink jet recording apparatus. The viscosity of the aqueous ink composition can be measured by analyzing the aqueous ink composition in VM-100AL viscometer (Yamaichi Electronics Co., Ltd.) at a constant temperature of 20° C.

2. Clear Ink Composition

The clear ink composition for the ink jet recording method according to this embodiment contains glycol ether at a content ratio in the range of 3 mass % to 10 mass %, inclusive, and a resin component but contains no coloring agent. In terms of appearance, therefore, this clear ink composition is a colorless and transparent or colorless and semitransparent liquid.

(1) Resin Component

The clear ink composition for the ink jet recording method according to this embodiment contains a resin component. The resin component will help the ink get cured and the cured ink strongly adhere to plastic media. Specific examples of the compounds that can be used as this resin component are the same as those listed above for the aqueous ink composition.

The content ratio of the resin component is preferably in the range of 5 mass % to 15 mass %, inclusive, and more preferably in the range of 5 mass % to 10 mass %, inclusive, on a solid content basis, relative to the total mass of the clear ink composition. A resin component having a content ratio falling within either one or both of these ranges will help the clear ink composition get cured and fixed well.

(2) Glycol Ether

The clear ink composition for the ink jet recording method according to this embodiment contains glycol ether. Glycol ethers have a hydroxy group and an ether group in their molecules; therefore, they are the solvent that combines the characteristics of aqueous solvent derived from their hydroxy group and those of lipid solvent derived from their ether group. Thanks to their characteristics of aqueous solvent derived from their hydroxy group, glycol ethers are soluble in water and thus can be added to aqueous clear ink. And, when a clear ink containing glycol ether is printed onto a plastic medium, the glycol ether helps, with its characteristics of lipid solvent derived from its ether group, droplets of the clear ink composition spread over the plastic medium without being repelled, and the resultant print has no streaks or other defects and thus are of good quality.

If any kind of glycol ether is added to an aqueous ink composition containing a pigment as a coloring agent, however, the glycol ether will act as lipid solvent to gradually dissolve the resin contained as a dispersant for the pigment and brings the pigment into a less stable dispersed state. This effect of making dispersion liquid unstable gets stronger as the concentration of the glycol ether increases. In particular, evaporation of water from the ink composition rapidly increases the effect and makes pigment particles aggregate.

The clear ink composition for the ink jet recording method according to this embodiment contains glycol ether at a content ratio in the range of 3 mass % to 10 mass %, inclusive. As mentioned above, glycol ethers can wet plastic media well. When the aqueous and clear ink compositions come into contact on a plastic medium, thus, the glycol ether also helps the droplets of the aqueous ink composition spread. As a result, droplets of the aqueous ink composition can easily reach neighboring ones on the plastic medium, and the resultant print has fewer streaks or other defects and better quality than those obtained in known methods.

Furthermore, glycol ethers can make particles of pigments and other coloring agents aggregate. When the aqueous and clear ink compositions come into contact on a plastic medium and then the recording medium is subjected to a heating process, a recording process preferred in the invention, until water evaporates out of both the aqueous and clear ink compositions on the medium, thus, the glycol ether makes the pigment particles in the aqueous ink composition aggregate, and the image formed in this way has an excellent color reproduction capability.

The content ratio of the glycol ether is in the range of 3 mass % to 10 mass %, inclusive, relative to the total mass of the clear ink composition. A glycol ether having a content ratio falling within this range will ensure that the clear ink composition has favorable storage stability and make it possible to give images an excellent color reproduction capability and excellent quickness to dry even on plastic media. A content ratio of the glycol ether falling short of this range may cause images to have a reduced color reproduction capability and/or streaks when plastic media are used. On the other hand, a content ratio of the glycol ether exceeding this range may cause images to be formed with reduced quickness to dry.

Examples of appropriate glycol ethers include ethylene glycol monomethyl ether, ethylene glycol monoethyl ether, ethylene glycol monoisopropyl ether, ethylene glycol monobutyl ether, ethylene glycol monoisobutyl ether, ethylene glycol mono-tert-butyl ether, ethylene glycol monomethyl ether acetate, diethylene glycol monomethyl ether, diethylene glycol monoethyl ether, diethylene glycol monopropyl ether, diethylene glycol monoisopropyl ether, diethylene glycol monobutyl ether, diethylene glycol mono-tert-butyl ether, diethylene,glycol monohexyl ether, triethylene glycol monobutyl ether, propylene glycol monomethyl ether, propylene glycol monoethyl ether, propylene glycol monopropyl ether, propylene glycol monoisopropyl ether, propylene glycol monobutyl ether, propylene glycol mono-tert-butyl ether, dipropylene glycol monomethyl ether, dipropylene glycol monoethyl ether, dipropylene glycol monopropyl ether, dipropylene glycol isopropyl ether, dipropylene glycol monobutyl ether, dipropylene glycol mono-tert-butyl ether, tripropylene glycol monomethyl ether, and triisopropylene glycol monomethyl ether. These glycol ethers may be used singly or in combination of two or more kinds.

Among others, glycol ethers having a relatively low surface tension are preferable because they can wet plastic media better than other kinds of glycol ethers can, and more specifically, glycol ethers having a surface tension at 20° C. of equal to or smaller than 30 mN/m are preferable. In the ink jet recording method according to this embodiment, it is preferable that the images formed on recording media are dried quickly, and thus the boiling point of the glycol ether is preferably equal to or lower than 300° C. When the drying process described later is used in the ink jet recording method, it is preferable that the glycol ether has a flash point equal to or higher than 100° C. so as not to ignite from heat during the drying process.

Specific examples of the glycol ethers that satisfy these conditions include triethylene glycol monobutyl ether (surface tension [ST]: 28 mN/m; boiling point (BP): 271° C.; flash point [FP]: 156° C.), diethylene glycol monohexyl ether (ST: 26 mN/m; BP: 259° C.; FP: 141° C.), and dipropylene glycol monopropyl ether (ST: 28 mN/m; BP: 212° C.; FP: 108° C.), and triethylene glycol monobutyl ether is more preferable than the others owing to its high compatibility with the clear ink composition.

On the other hand, the aqueous ink composition for the ink jet recording method according to this embodiment preferably contains no glycol ether. An aqueous ink composition containing any kind of glycol ether may be affected by the aggregation of the particles of its coloring agent such as a pigment and lose its storage stability during long-term storage.

(3) Surfactant

The clear ink composition for the ink jet recording method according to this embodiment can contain a surfactant. The addition of a surfactant will help the clear ink composition wet and penetrate plastic media well.

Examples of appropriate surfactants include silicone surfactants and acetylene glycol surfactants. Specific examples of the compounds that can be used as the surfactant are the same as those listed above for the aqueous ink composition.

When a surfactant is used, its content ratio is preferably in the range of 0.1 mass % to 1.5 mass %, inclusive, relative to the total mass of the clear ink composition. A surfactant having a content ratio falling within this range can fully provide its effect described above.

(4) Water-Soluble Organic Solvent

The clear ink composition for the ink jet recording method according to this embodiment can contain a water-soluble organic solvent. Examples of preferred water-soluble organic solvents include 1,2-alkanediols, multivalent alcohols, and pyrrolidone derivatives.

A reason for the preference for 1,2-alkanediols is that they can drastically improve, synergistically with the glycol ether and surfactant mentioned above, the wettability of this ink composition to plastic media and thereby help the ink composition wet such a medium evenly. A 1,2-alkanediol, when contained in the clear ink composition, will improve the uniformity in flatness of ink coatings and reduce the inconsistency in color density and cloudiness of the resultant images. Furthermore, importantly, 1,2-alkanediols are highly compatible with glycol ethers. Thus, when the clear ink composition contains any kind of 1,2-alkanediol, which is highly compatible with glycol ethers, the glycol ether mentioned above is highly soluble in the clear ink composition, and this will ensure improved storage stability and discharge stability of the clear ink composition.

When a 1,2-alkanediol is used, its content ratio is preferably in the range of 1 mass % to 8 mass %, inclusive, relative to the total mass of the clear ink composition. Specific examples of appropriate 1,2-alkanediols are the same as those listed above for the aqueous ink composition.

A reason for the preference for multivalent alcohols is that they will make the ink slow to dry and to get cured on the nozzle face of an ink jet head and thereby prevent defects during printing such as clogging and incomplete discharge of the irk. Preferred kinds of multivalent alcohols are ones having a high vapor pressure. A reason for this is that it is desirable that the water-soluble organic solvent should evaporate away along with water while the clear ink composition is drying. When a multivalent alcohol is used, its content ratio is preferably in the range of 2 mass % to 20 mass %, inclusive, relative to the total mass of the clear ink composition. A multivalent alcohol having a content ratio falling within this range can fully provide its effect described above. Specific examples of appropriate multivalent alcohols are the same as those listed above for the aqueous ink composition.

A reason for the preference for pyrrolidone derivatives is that they will act as a solvent or softener good for both the resin component mentioned above and the ink-fixing surface of plastic media. Furthermore, the addition of a pyrrolidone derivative will help the resin component form a coating on a plastic medium while the ink is drying and thereby make the ink quick to get cured and fixed on the plastic medium. When a pyrrolidone derivative is used, its content ratio is preferably in the range of 1 mass % to 8 mass %, inclusive, relative to the total mass of the clear ink composition. A pyrrolidone derivative having a content ratio falling within this range can fully provide its effect described above. Specific examples of appropriate pyrrolidone derivatives are the same as those listed above for the aqueous ink composition.

(5) Water

The clear ink composition for the ink jet recording method according to this embodiment can contain water. Water is the most common vehicle for ink compositions, and it evaporates and disperses in the air when its surroundings are dry. Preferably, the water is, if contained in the clear ink composition, purified water such as ion-exchanged water, ultrafiltered water, reverse-osmosis-purified water, or distilled water, ultrapure water, or any other kind of water containing as small amounts of ionic impurities as possible. Sterilized water obtained by irradiation with ultraviolet light, the addition of hydrogen peroxide, or any other appropriate technique is more preferable because water sterilized in such a way will prevent molds and bacteria from occurring in the clear ink composition during long-term storage.

(6) Polyolefin Wax

The clear ink composition for the ink jet recording method according to this embodiment can contain polyolefin wax. The addition of polyolefin wax is preferable because it will make it possible to form images with good physical smoothness and friction fastness even on plastic media. When polyolefin wax is used, its content ratio is preferably in the range of 0.01 mass % to 10 mass %, inclusive, and more preferably in the range of 0.05 mass % to 5 mass %, inclusive, relative to the total mass of the clear ink composition. A polyolefin wax having a content ratio falling within either one or both of these ranges can fully provide its effect described above. Specific examples of appropriate polyolefin waxes are the same as those listed above for the aqueous ink composition.

(7) Other Ingredients

The clear ink composition for the ink jet recording method according to this embodiment can further contain a pH adjusting agent, a preservative/antimold, an antirust, a chelator, and/or other additives. The addition of these materials is preferable because they can further improve the characteristics of the clear ink composition. Specific examples of appropriate additives are the same as those listed above for the aqueous ink composition.

(8) Physical Properties

The viscosity of the clear ink composition for the ink jet recording method according to this embodiment at 20° C. is preferably in the range of 2 mPa·s to 10 mPa·s, inclusive, and more preferably in the range of 3 mPa·s to 6 mPa·s. A clear ink composition having a viscosity at 20° C. falling within either one or both of these ranges can be discharged from nozzles in an appropriate amount and thus will be further prevented from travelling in random directions and spattering; such an ink composition is suitable for use in an ink jet recording apparatus. The viscosity of the clear ink composition can be measured by analyzing the clear ink composition in VM-100AL viscometer (Yamaichi Electronics Co., Ltd.) at a constant temperature of 20° C.

3. Ink Jet Recording Method

The ink jet recording method according to an embodiment of the invention includes discharging droplets of the aqueous ink composition described above onto a non- or low-ink-absorbent recording medium as a first process and discharging droplets of the clear ink composition described above onto the recording medium as a second process. The first and second processes are performed in a single operation, and the droplets of the aqueous ink composition discharged in this single operation and those of the clear ink composition discharged in the same operation come into contact on the recording medium.

In the ink jet recording method according to the invention, a single operation represents a single scan (hereinafter, also referred to as a single pass) for forming a certain image from both the aqueous and clear ink compositions. The scan is the action of a recording head having nozzles for discharging ink to move over a recording medium and let the nozzles discharge the ink onto the recording medium. And, a single scan corresponds to the period of time after the recording head starts to move until it comes to a halt. Therefore, a single operation includes all the following cases: Both the ink compositions are discharged exactly at the same time; In a single pass, the aqueous ink composition is first discharged, and then the clear ink composition is discharged; In a single pass, the clear ink composition is first discharged, and then the aqueous ink composition is discharged.

The droplets of the aqueous ink composition discharged in a single scan and those of the clear ink composition discharged in the same scan come into contact on a recording medium. It does not matter in which of the following ways the droplets of the aqueous ink composition and those of the clear ink composition come into contact: Either one of these sets of droplets is first discharged onto the recording medium, and then, while this first set remains on the recording medium, the other is discharged and comes into contact with the first set; Both the sets of droplets are simultaneously discharged onto the recording medium and come into contact.

Incidentally, recording an image on a single recording medium may be completed by several scans or only a single scan. In the latter case, the recording apparatus can be a so-called line printer, a printer allowing the use of a recording head having a length corresponding to the width of the recording medium to be used.

In the ink jet recording method according to this embodiment, droplets of the aqueous ink composition and those of the clear ink composition are discharged in a single operation-and in such a manner that these two sets of droplets, at least in part, come into contact on a plastic medium. This means that the two sets of droplets are mixed at least in part before they dry out, or get cured. The image formed on the plastic medium has, thanks to the action of the clear ink composition, an excellent color reproduction capability.

Furthermore, the image formed on the plastic medium has been coated at least in part with the clear ink composition and thus has excellent friction fastness.

In the ink jet recording method according to the invention, the relative weight of the droplets of the clear ink composition to those of the aqueous ink composition is preferably in the range of 20% to 50%, inclusive. This allows images to be formed with improved quickness to dry even on plastic media.

For example, in a known ink jet recording method, an aqueous ink composition discharged onto a plastic medium in the same amount as onto a paper-based medium is repelled by the recording medium (FIG. 1), and the recorded image has streaks and other defects.

Figure 2:
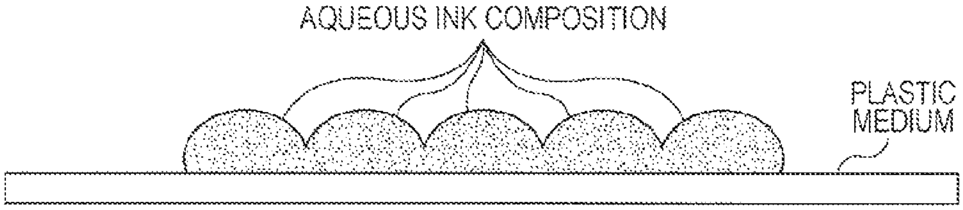
FIG. 2 is a schematic diagram that illustrates an aqueous ink composition discharged onto a recording medium.

However, a reduced interval between droplets of the ink composition for preventing the streaks leads to an increased amount of ink per unit area (FIG. 2). As a result, the recorded image has ink bleed and needs an increased amount of energy to dry.

Figure 3:
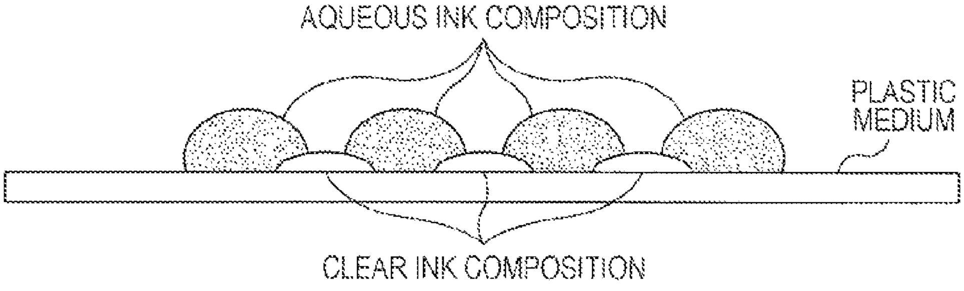
FIG. 3 is a schematic diagram that illustrates aqueous and clear ink compositions discharged onto a recording medium.

On the other hand, in the ink jet recording method according to this embodiment, the clear ink composition, which can wet plastic media well, and the aqueous ink composition are discharged onto a recording medium so as to come into contact (FIG. 3); as a result, the recorded image has no streaks and thus is of good quality. Furthermore, the clear ink composition, which contains glycol ether, can wet plastic media well. Thus, a relative weight of the droplets of the clear ink composition to those of the aqueous ink composition falling within the range of 20% to 50%, inclusive, allows this effect to be fully provided.

The clear ink composition contains no coloring agent and thus can be used in combination with any color ink. For example, an ink jet printer allowing the discharge of six colors of aqueous ink compositions can be revised to discharge the clear ink composition simply by adding another line of nozzles for discharging the clear ink composition to the existing lines for discharging the six colors.

Incidentally, the ink jet recording method according to the invention can be used in known ink jet recording modes including thermal ink ejection, piezoelectric ink ejection, serial ink ejection, roller application, and spray application.

Any kind of ink jet recording apparatus that supports one or more of these ink jet recording modes can be used as long as it makes records by discharging droplets of ink and letting the droplets adhere to a recording medium; however, ones that can heat the recording medium during a printing operation are preferable. Here, a printing operation represents the period of time just after droplets of ink discharged from an ink jet recording apparatus land on the recording medium until the ink dries out.

There are several ways available to heat a recording medium, including direct heating with a heater during printing, indirect heating by irradiation with infrared rays or the microwave (an electromagnetic wave having its maximum intensity around a wavelength of 2,450 MHz), and hot air heating with a dryer. A heater and a dryer may be used separately or in combination. The combination use of a heater and a dryer allows the control of the drying temperature during printing operations.

There is also another way to heat a recording medium, discharging droplets of ink from an ink jet recording apparatus and then drying the recording medium retaining the droplets in a drying oven or an incubator preheated to a certain temperature.

The recording medium that can be used in this method is non- or low-ink-absorbent one. Examples of non-ink-absorbent recording media include plastic films not surface-treated for ink jet printing (i.e., plastic films having no ink-absorbing layer), and sheets of paper or similar kind of substrate each coated with plastic or covered with a sticky plastic film. The plastic materials that can be used here include polyvinyl chloride, polyethylene terephthalate, polycarbonate, polystyrene, polyurethane, polyethylene, and polypropylene. On the other hand, examples of low-ink-absorbent recording media include printing paper such as art paper, coated paper, and matt paper. Besides these recording media, metallic or glass-based ones, or other kinds of non- or low-ink-absorbent recording media can be used.

In this specification, a non- or low-ink-absorbent recording medium represents a recording medium that absorbs $\leq 10$ $mL/m^2$ of water in 30 $msec^{1/2}$ from the time of contact in the Bristow method. The Bristow method is the most popular one of quick measurement methods for determining liquid absorption and also endorsed by Japan Technical Association of the Pulp and Paper Industry (JAPAN TAPPI). For detailed test methods, see Test No. 51 of JAPAN TAPPI's pulp and paper test guidelines 2000 edition, which specifies procedures for testing paper and cardboard for liquid absorbency by the Bristow method. Incidentally, in this specification, such a non- or low-ink-absorbent recording medium is also referred simply to as a plastic medium.

The following details an ink jet recording method according to this embodiment that uses an ink jet recording apparatus. First, the aqueous ink composition described above is discharged in the form of droplets onto a plastic medium (a first process). Then, the clear ink composition described above is discharged in the form of droplets onto the plastic medium at the sites retaining the droplets of the aqueous ink composition (a second process). This process makes the droplets of the aqueous ink composition and those of the clear ink composition come into contact and get mixed at least in part. The first and second processes are performed in a single scan (in the same scan).

Then, the plastic medium is heated to at least 40° C. until the aqueous and clear ink compositions dry out (a third process). The plastic medium can be dried with a heater for direct heating during printing, a dryer, or any other similar heating device fit to the ink jet recording apparatus. This process helps water and other evaporable components existing in the aqueous and clear ink compositions discharged onto the recording medium quickly evaporate away to leave a coating. In this way, it becomes possible to quickly obtain high-quality images even on plastic media.

The temperature for heating the plastic medium is usually equal to or higher than 40° C., preferably in the range of 40° C. to 80° C., inclusive, and more preferably in the range of 40° C. to 60° C., inclusive. A heating temperature equal to or higher than 40° C. greatly helps the solvents contained in the aqueous and clear ink compositions evaporate away. Considering the upper temperature limit of plastic media, however, heating at any temperature equal to or higher than 100° C. is not preferable.

The length of time of heating the plastic medium is not particularly limited as long as the solvents contained in the aqueous and clear ink compositions can evaporate away to leave a coating in that length of time; Any length of time can be suitably selected depending on the kind of the solvent and the resin component used, the desired printing speed, and other factors.

4. Recorded Matter

The recorded matter according to an embodiment of the invention is a record or records made using the ink jet recording method described above. The images produced on plastic media using this method, which are formed from the aqueous and clear ink compositions described above, have fewer streaks than those produced using any known method, are of good quality with their excellent color reproduction capability, and have excellent friction fastness.

5. Examples

The following describes the invention in more detail with reference to examples; however, the invention is not limited to these examples.

5.1. Preparation of Pigment Dispersion Liquids

The aqueous ink compositions used in these examples were pigment dispersion liquids each prepared by dispersing a pigment in water with a resin dispersant.

More specifically, one of the pigment dispersion liquids was prepared in the following way. First, ion-exchanged water was added to 7.5 parts by mass of an acrylic acid-acrylate copolymer as a resin dispersant and 20 parts by mass of C.I. Pigment Blue 15:3 as a pigment to make the total amount 100 parts by mass, and then the ingredients were blended by stirring to form a mixture. The obtained mixture and zirconia beads (diameter: 1.5 mm) were put into a sand mill (Yasukawa Seisakusho K.K.) and processed to disperse for six hours. After that, the zirconia beads were removed using a separator. In this way, a cyan pigment dispersion liquid was obtained.

Another five colors of pigment dispersion liquids (magenta, yellow, orange, green, and black) were also prepared in the same way except the pigment used. The pigment used was C.I. Pigment Red 122 for the magenta dispersion liquid, C.I. Pigment Yellow 180 for the yellow dispersion liquid, C.I. Pigment Orange 43 for the orange dispersion liquid, C.I. Pigment Green 36 for the green dispersion liquid, and Carbon Black MA77 for the black dispersion liquid.

5.2. Preparation of Aqueous Ink Compositions

The obtained pigment dispersion liquids were each combined with a resin component, water-soluble organic solvent, a surfactant, polyolefin wax, and ion-exchanged water in accordance with the formulations specified in Table 1. The obtained mixtures were then stirred at room temperature for one hour and individually filtered through a 5-μm membrane filter. In this way, Aqueous Ink Compositions A1 to A6 in Table 1 were obtained.

The following lists the materials used to prepare the aqueous ink compositions in Table 1.

(1) Pigment
- C.I. Pigment Blue 15:3
- C.I. Pigment Red 122
- C.I. Pigment Yellow 180
- C.I. Pigment Orange 43
- C.I. Pigment Green 36
- Carbon Black MA77 (trade name; Mitsubishi Chemical Corporation)

(2) Pigment Dispersant
- An acrylic acid-acrylate copolymer (molecular weight: 20,000; glass transition temperature: 50° C.; acid value: 180)

(3) Resin Component
- A styrene acrylic acid copolymer (thermoplastic-resin particles; average particle diameter: 50 nm; molecular weight: 55,000; glass transition temperature: 80° C.; acid value: 130)

(4) Water-soluble Organic Solvent
- 1,2-hexanediol
- 2-pyrrolidone
- Propylene glycol (5) Surfactant
- A silicone surfactant (polyether-modified siloxane available under the trade name of BYK-348 from BYIC Japan KK)
- An acetylene glycol surfactant (Surfynol DF-110D available from Nissin Chemical Co., Ltd.)

(6) Polyolefin Wax
- Polyethylene wax (AQUACER 515 available from BYK Japan KK)

TABLE 1

| Aqueous ink composition | | A1 Cyan | A2 Magenta | A3 Yellow | A4 Orange | A5 Green | A6 Black |
|---|---|---|---|---|---|---|---|
| Pigment | C.I. Pigment Blue 15:3 | 4 | | | | | |
| | C.I. Pigment Red 122 | | 4 | | | | |
| | C.I. Pigment Yellow 180 | | | 4 | | | |
| | C.I. Pigment Orange 43 | | | | 4 | | |
| | C.I. Pigment Green 36 | | | | | 4 | |
| | Carbon Black MA77 | | | | | | 4 |
| Pigment dispersant | Acrylic acid-acrylate copolymer | 1.5 | 1.5 | 1.5 | 1.5 | 1.5 | 1.5 |
| Resin component | Styrene-acrylic acid copolymer | 1 | 1 | 1 | 1 | 1 | 1 |
| Polyolefin wax | Polyethylene wax | 0.5 | 0.5 | 0.5 | 0.5 | 0.5 | 0.5 |

TABLE 1-continued

| Aqueous ink composition | | A1 Cyan | A2 Magenta | A3 Yellow | A4 Orange | A5 Green | A6 Black |
|---|---|---|---|---|---|---|---|
| Water-soluble organic solvent | 1,2-hexanediol | 5 | 5 | 5 | 5 | 5 | 5 |
| | 2-pyrrolidone | 5 | 5 | 5 | 5 | 5 | 5 |
| | Propylene glycol | 10 | 10 | 10 | 10 | 10 | 10 |
| Surfactant | Silicone surfactant | 0.5 | 0.5 | 0.5 | 0.5 | 0.5 | 0.4 |
| | Acetylene glycol surfactant | 0.2 | 0.2 | 0.2 | 0.2 | 0.2 | 0.2 |
| Ion-exchanged water | | Balance | Balance | Balance | Balance | Balance | Balance |
| Total | | 100 | 100 | 100 | 100 | 100 | 100 |

(Unit: mass %)

5.3. Preparation of Clear Ink Compositions

Clear ink compositions were prepared in the following way. First, a resin component, glycol ether, water-soluble organic solvent, a surfactant, polyolefin wax, and ion-exchanged water were mixed in accordance with the formulations specified in Table 2. Then, the obtained mixtures were stirred at room temperature for one hour. In this way, Clear Ink Compositions B1 to B7 in Table 2 were obtained.

The following lists the materials used to prepare the clear ink compositions in Table 2.

(1) Resin Component

A styrene-acrylic acid copolymer (thermoplastic-resin particles; average particle diameter: 50 nm; molecular weight: 55,000; glass transition temperature: 80° C.; acid value: 130)

(2) Glycol Ether

Triethylene glycol monobutyl ether (3) Water-soluble Organic Solvent 1,2-hexanediol 2-pyrrolidone Propylene glycol (4) Surfactant A silicone surfactant (polyether-modified siloxane available under the trade name of BYK-348 from BYK Japan KK)

(5) Polyolefin wax

Polyethylene wax (AQUACER 515 available from BYK Japan KK)

TABLE 2

| Clear ink composition | | B1 | B2 | B3 | B4 | B5 | B6 | B7 |
|---|---|---|---|---|---|---|---|---|
| Resin component | Styrene-acrylic acid copolymer | 8 | 8 | 8 | 8 | 8 | 8 | 8 |
| Glycol ether | Triethylene glycol monobutyl ether | 5 | 10 | 3 | 11 | 15 | 2 | |
| Polyolefin wax | Polyethylene wax | 2 | 2 | 2 | 2 | 2 | 2 | 2 |
| Water-soluble organic solvent | 1,2-hexanediol | 5 | 5 | 5 | 5 | 5 | 5 | 5 |
| | 2-pyrrolidone | 5 | 5 | 5 | 5 | 5 | 5 | 5 |
| | Propylene glycol | 10 | 10 | 10 | 10 | 10 | 10 | 10 |
| Surfactant | Silicone surfactant | 0.5 | 0.5 | 0.5 | 0.5 | 0.5 | 0.5 | 0.5 |
| Ion-exchanged water | | Balance | Balance | Balance | Balance | Balance | Balance | Balance |
| Total | | 100 | 100 | 100 | 100 | 100 | 100 | 100 |

(Unit: mass %)

5.4. Evaluation Tests 5.4.1. Evaluation of Storage Stability

Aqueous Ink Compositions A1 to A6 and Clear Ink Compositions B1 to B7 were put into separate sample bottles, and the sample bottles were tightly closed. The closed sample bottles were stored at 60° C. for 14 days, and subsequently the viscosity was measured for all the ink compositions at 20° C. The storage stability was evaluated by comparing the viscosity at 20° C. before storage and that at 20° C. after storage. For the measurement of viscosity, the sample bottles were maintained in an incubator at 20° C. for four hours, and then the ink compositions were analyzed in VM-100AL viscometer (Yamaichi Electronics Co., Ltd.). The evaluation criteria used and the corresponding grades are as follows:

A: The percent change in viscosity was smaller than 10%.

B: The percent change in viscosity was in the range of ≥10% to <20%.

C: The percent change in viscosity was equal to or greater than 20%.

5.4.2. Test for Color Reproduction Capability (1) Production of Recorded Matter

PX-G930 ink jet printer (Seiko Epson Corp.; nozzle resolution: 180 dpi) was partially modified by attaching a temperature-adjustable heater to its paper guide portion so that recording media could be subjected to controlled heating during image recording.

Ink sets were prepared as combinations of the six colors of aqueous ink compositions (Aqueous Ink Compositions A1 to A6) and one of Clear Ink Compositions B1 to B7; however, one of the ink sets included no clear ink composition. The following describes the typical procedure for making recorded matter in this test: An ink set was loaded into the modified printer in such a manner that the aqueous and clear ink compositions should fill separate lines of nozzles; the aqueous and clear ink compositions were discharged onto a recording medium to make a color chart image containing 384 colored patches. All the ink compositions were discharged in a single operation, and each of the aqueous ink compositions and the clear ink composition came into contact on the recording medium, except that no clear ink composition was used for one of the ink sets, and the aqueous ink compositions and the clear ink composition were discharged with some time lag for another. The obtained color chart image was dried by heating the recording medium to 45° C.

with the heater attached to the paper guide portion of the printer. Then, the recording medium was put into a drying oven maintained at 70° C., and the color chart image was dried for another one minute. In this way, a piece of recorded matter was obtained as a recording medium having a color chart image printed thereon. Further pieces of recorded matter were also prepared using the other ink sets separately.

For all the ink sets, two kinds of recording media were used, one made of polyester (PG-50L cold laminate films available from Lami Corporation) and the other made of polypropylene (YUPO80 available from Lintec Corporation). All the color chart images were printed with a fixed resolution of 720 dpi×720 dpi.

(2) Method for Evaluating Recorded Matter

The obtained color chart images were subjected to color measurement with a spectrophotometer (Spectrolino available from GretagMacbeth), and L*, a*, and b* values were determined. The L*a*b* color space volume (gamut volume) was calculated from these values and compared among the color chart images, and the color reproduction capability was evaluated through the comparisons. The L*a*b* color space volume is a value calculated by dividing the L* axis in a color space in the L*a*b* colorimetric system, determining the a*b* space region (a* and b* values) for each L* division, and then calculating the a*b* space region for the total L* value.

The evaluation criteria used and the corresponding grades are as follows:

A: The gamut volume was equal to or larger than 600000.

B: The gamut volume was in the range of ≥400000 to <600000.

C: The gamut volume was smaller than 400000.

5.4.3. Test for Completeness of Solid Print (1) Production of Recorded Matter

Ink sets were prepared as combinations of the six colors of aqueous ink compositions (Aqueous Ink Compositions A1 to A6) and one of Clear Ink Compositions B1 to B7; however, one of the ink sets included no clear ink composition. The following describes the typical procedure for making recorded matter in this test: An ink set was loaded into the modified PX-G930 printer in such a manner that the aqueous and clear ink compositions should fill separate lines of nozzles; the aqueous and clear ink compositions were discharged onto a recording medium to make an image solid-patterned in different colors. All the ink compositions were discharged in a single operation, and each of the aqueous ink compositions and the clear ink composition came into contact on the recording medium, except that no clear ink composition was used for one of the ink sets, and the aqueous ink compositions and the clear ink composition were discharged with some time lag for another. The obtained solid-patterned image was dried by heating the recording medium to 45° C. with the heater attached to the paper guide portion of the printer. Then, the recording medium was put into a drying oven maintained at 70° C., and the solid-patterned image was dried for another one minute. In this way, a piece of recorded matter was obtained as a recording medium having a solid-patterned image printed thereon. Further pieces of recorded matter were also prepared using the other ink sets separately.

For all the ink sets, two kinds of recording media were used, one made of polyester (PG-50L cold laminate films available from Lami Corporation) and the other made of polypropylene (YUPO80 available from Lintec Corporation). All the solid-patterned images were printed with a fixed resolution of 720 dpi×720 dpi.

(2) Method for Evaluating Recorded Matter

The obtained pieces of recorded matter were visually inspected for the completeness of the solid-patterned image. The evaluation criteria used and the corresponding grades are as follows:

A: The pattern was completely solid, and the image was of favorable quality with no streaks observed.

B: The pattern was almost completely solid, but a few streaks were observed.

C: The pattern was incompletely solid, and a number of streaks were observed.

D: The pattern was far from completely solid, and the base medium could be seen.

5.4.4. Test for Friction Fastness

The pieces of recorded matter obtained in 5.4.3. Test for Completeness of Solid Print were maintained at 20° C. for 24 hours, rubbed in AB-301 color fastness rubbing tester (Tester Sangyo Co., Ltd.) with a grinder covered with plain paper with the load set at 300 g and the number of times of friction 10, and then visually inspected for the surface condition of the image. The evaluation criteria used and the corresponding grades are as follows:

A: No scratches were observed on the surface of the image.

B: Some scratches were observed on the surface of the image, but no prominent image detachment was observed, and the base medium was not exposed.

C: Scratches were clearly observed on the surface of the image, the image had partially detached, and the base medium could be seen.

D: The image had detached, and the base medium could be seen.

5.4.5. Evaluation of Quickness to Dry

The pieces of recorded matter obtained in 5.4.3. Test for Completeness of Solid Print were maintained at 20° C. for one hour and then evaluated for dryness by rubbing with fingers. The evaluation criteria used and the corresponding grades are as follows:

A: The recorded matter did not feel moist when rubbed with fingers, and no stains adhered to the fingers.

B: The recorded matter felt slightly moist when rubbed with fingers, but no stains adhered to the fingers.

C: The recorded matter felt moist when rubbed with fingers, and stains adhered to the fingers.

5.5. Test Results

Table 3 summarizes the results of these evaluation tests.

TABLE 3

| | | | Example | | | Comparative Example | | | | | |
|---|---|---|---|---|---|---|---|---|---|---|---|
| | | | 1 | 2 | 3 | 1 | 2 | 3 | 4 | 5 | 6 |
| Ink set | Clear ink composition | | B1 | B2 | B3 | B4 | B5 | B6 | B7 | — | B1 |
| | Aqueous ink composition | C | A1 | A1 | A1 | A1 | A1 | A1 | A1 | A1 | A1 |
| | | M | A2 | A2 | A2 | A2 | A2 | A2 | A2 | A2 | A2 |
| | | Y | A3 | A3 | A3 | A3 | A3 | A3 | A3 | A3 | A3 |
| | | Or | A4 | A4 | A4 | A4 | A4 | A4 | A4 | A4 | A4 |

TABLE 3-continued

| | | | Example | | | Comparative Example | | | | | |
|---|---|---|---|---|---|---|---|---|---|---|---|
| | | | 1 | 2 | 3 | 1 | 2 | 3 | 4 | 5 | 6 |
| | | Gr | A5 | A5 | A5 | A5 | A5 | A5 | A5 | A5 | A5 |
| | | Bk | A6 | A6 | A6 | A6 | A6 | A6 | A6 | A6 | A6 |
| Timing of discharge of aqueous and clear ink compositions | | | Simul. | Simul. | Simul. | Simul. | Simul. | Simul. | Simul. | CL omitted | AQ → CL |
| Evaluation tests | Color reproduction | PE | A | A | B | A | A | B | C | D | D |
| | | PP | A | A | A | A | A | B | C | D | D |
| | Completeness of solid print | PE | A | A | A | A | A | B | C | D | D |
| | | PP | A | A | A | A | A | B | D | D | D |
| | Friction fastness | PE | A | A | A | A | A | A | A | D | A |
| | | PP | A | A | A | A | B | A | A | C | A |
| | Quickness to dry | PE | A | B | A | C | C | A | A | A | A |
| | | PP | A | A | A | C | D | A | A | A | A |
| | Storage stability | CL | A | A | A | A | A | A | A | A | A |
| | | AQ | A | A | A | B | C | A | A | — | A |

C: cyan ink composition;
M: magenta ink composition;
Y: yellow ink composition;
Or: orange ink composition;
Gr: green ink composition;
Bk: black ink composition
PE: polyester medium;
PP: polypropylene medium;
CL: clear ink composition;
AQ: aqueous ink composition
Simul.: simultaneous The aqueous and clear ink compositions according to Examples 1 to 3 in Table 3 all experienced only a small change in viscosity and proved to have excellent storage stability. Furthermore, the images obtained with these sets of ink compositions have an excellent color reproduction capability, completeness of solid print, excellent friction fastness, and excellent quickness to dry.

As for the aqueous and clear ink compositions according to Comparative Examples 1 and 2 in Table 3, the clear ink composition, which contained glycol ether at a content ratio exceeding 10 mass %, was not excellent in storage stability, and the recorded images were of relatively poor quickness to dry.

As for the aqueous and clear ink compositions according to Comparative Example 3 in Table 3, the clear ink composition contained glycol ether at a content ratio smaller than 3 mass %, and the images were not of excellent color reproduction capability. Worse yet, the solid-patterned images had a few streaks; none of the recorded images were of favorable quality.

As for the aqueous and clear ink compositions according to Comparative Example 4 in Table 3, the clear ink composition contained no glycol ether, and the images had a reduced color reproduction capability. Worse yet, the solid-patterned images were far from completely solid with streaks observed; none of the recorded images were of favorable quality.

As for Comparative Example 5 in Table 3, no clear ink composition was used in the formation of the images. As a result, the images were of poor color reproduction capability. Worse yet, the solid-patterned images were far from completely solid; none of the recorded images were of favorable quality. Furthermore, the images, formed using no clear ink composition, were not of excellent friction fastness.

As for Comparative Example 6 in Table 3, the aqueous and clear ink compositions were not discharged in a single operation. More specifically, a six-color solid-patterned image was first produced by discharging only the aqueous ink compositions onto a recording medium, and then, after the ejected recording medium was returned to the printer, only the clear ink composition was discharged to overlie the solid-patterned image. Since the aqueous and clear ink compositions were not discharged in a single operation, the images were of poor color reproduction capability. Worse yet, the solid-patterned images were far from completely solid; none of the recorded images were of favorable quality.

The invention is not limited to the embodiments described above; various modifications are allowed. For example, the invention includes constitutions that are substantially the same as those described as the embodiments (e.g., ones that have the same function, are based on the same method, and provide the same results as those for the embodiments, or ones for the same purposes and advantages as those of the embodiments). Furthermore, the invention includes constitutions obtained by changing any nonessential part(s) of those described as the embodiments. Moreover, the invention includes constitutions that have the same operations and offer the same advantages as those described as the embodiments or that can achieve the same purposes as those described as the embodiments. Additionally, the invention includes constitutions obtained by adding any known technology(ies) to those described as the embodiments.

What is claimed is:

1. An ink jet recording method comprising:

discharging a droplet of an ink composition containing a coloring agent and water onto a non- or low-ink-absorbent recording medium as a first process;

discharging a droplet of a clear ink composition containing glycol ether, a resin component, and water onto the recording medium as a second process, the clear ink composition not containing a coloring agent; and drying the ink composition and the clear ink compositions discharged onto the recording medium by heating the recording medium to a temperature equal to or greater than 40 C, wherein the first and second processes are performed in a single operation, and the droplet of the ink composition discharged in the single operation and the droplet of the clear ink composition discharged in the same operation come into contact on the recording medium.

2. The ink jet recording method according to claim 1, wherein:

the glycol ether is at least one selected from triethylene glycol monobutyl ether, diethylene glycol monohexyl ether, and dipropylene glycol monopropyl ether.

3. Recorded matter recorded using the ink jet recording method according to claim 2.

4. The ink jet recording method according to claim 1, wherein:

the weight of the droplet of the clear ink composition is in the range of 20% to 50% relative to the weight of the droplet of the aqueous ink composition.

5. Recorded matter recorded using the ink jet recording method according to claim 4.

6. The ink jet recording method according to claim 1, wherein:

the content ratio of the resin component is in the range of 5 mass % to 15 mass %.

7. Recorded matter recorded using the ink jet recording method according to claim 6.

8. Recorded matter recorded using the ink jet recording method according to claim 1.

9. The ink jet recording method of claim 1, wherein the clear ink composition contains 1,2-alkanediol.

10. The ink jet recording method of claim 1, wherein the clear ink composition includes a polyolefin wax.

11. The ink jet recording method of claim 1, wherein the clear ink composition contains the glycol ether at a content ratio in the range of 3 mass % to 10 mass %.

* * * * *